(12) United States Patent
Kang et al.

(10) Patent No.: US 12,145,527 B2
(45) Date of Patent: Nov. 19, 2024

(54) AIRBAG APPARATUS FOR VEHICLE

(71) Applicants: Hyundai Motor Company, Seoul (KR); Kia Corporation, Seoul (KR)

(72) Inventors: Seungkyu Kang, Hwaseong-si (KR); Jong-Hun Choi, Incheon (KR); Eun Mook Park, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/337,248

(22) Filed: Jun. 19, 2023

(65) Prior Publication Data

US 2024/0101061 A1   Mar. 28, 2024

(30) Foreign Application Priority Data

Sep. 27, 2022   (KR) .................. 10-2022-0122297

(51) Int. Cl.
| | |
|---|---|
| *B60R 21/232* | (2011.01) |
| *B60R 21/01* | (2006.01) |
| *B60R 21/0136* | (2006.01) |
| *B60R 21/213* | (2011.01) |
| *B60R 21/231* | (2011.01) |
| *B60R 21/2338* | (2011.01) |
| *B60R 21/237* | (2006.01) |
| *B60R 21/268* | (2011.01) |

(52) U.S. Cl.
CPC ........ *B60R 21/232* (2013.01); *B60R 21/0136* (2013.01); *B60R 21/213* (2013.01); *B60R 21/2338* (2013.01); *B60R 21/237* (2013.01); *B60R 2021/01231* (2013.01); *B60R 2021/23107* (2013.01); *B60R 2021/23161* (2013.01); *B60R 21/268* (2013.01)

(58) Field of Classification Search
CPC .. B60R 2021/0009; B60R 2021/01231; B60R 2021/23107; B60R 2021/23153; B60R 2021/23161; B60R 2021/23386; B60R 2021/23388; B60R 21/0136; B60R 21/213; B60R 21/214; B60R 21/232; B60R 21/2338; B60R 21/237; B60R 21/268

See application file for complete search history.

(56) References Cited

U.S. PATENT DOCUMENTS 5,333,899 A * 8/1994 Witte ................ B60R 21/23138
                                                   280/730.2
6,123,355 A * 9/2000 Sutherland ............ B60R 21/232
                                                   280/736

(Continued)

FOREIGN PATENT DOCUMENTS

| JP | 2014076702 A | 5/2014 |
|---|---|---|
| KR | 20210009121 A | 1/2021 |

(Continued)

*Primary Examiner* — Laura Freedman
(74) *Attorney, Agent, or Firm* — Slater Matsil, LLP

(57) ABSTRACT

An airbag apparatus for a vehicle includes a roof airbag device including a roof cushion mounted on a roof of a vehicle body and protruding toward a lower side of a vehicle compartment in a deployed state, a curtain airbag device including a curtain cushion mounted on the vehicle body around a side window to cover the side window in the deployed state, and a coupling unit configured to couple the roof cushion to be supported on the curtain cushion.

20 Claims, 11 Drawing Sheets

(56) References Cited

U.S. PATENT DOCUMENTS

| | | | |
|---|---|---|---|
| 6,481,743 B1* | 11/2002 | Tobe | B60R 21/232 |
| | | | 280/730.2 |
| 6,991,255 B2* | 1/2006 | Henderson | B60R 21/232 |
| | | | 280/730.2 |
| 9,004,526 B2 | 4/2015 | Fukawatase et al. | |
| 9,016,717 B1 | 4/2015 | Clauser et al. | |
| 9,327,669 B2* | 5/2016 | Jaradi | B60R 21/08 |
| 9,610,915 B2* | 4/2017 | Specht | B60R 21/233 |
| 9,676,361 B2* | 6/2017 | Smith | B60R 21/231 |
| 10,300,880 B2* | 5/2019 | Mihm | B60R 21/16 |
| 10,471,923 B2* | 11/2019 | Jimenez | B60R 21/01512 |
| 11,186,246 B2* | 11/2021 | Min | B60R 21/23138 |
| 11,345,299 B2 | 5/2022 | Jeong et al. | |
| 11,433,846 B2* | 9/2022 | Ugarte Alba | B60R 21/232 |
| 11,648,908 B2 | 5/2023 | Sung et al. | |
| 2006/0097491 A1* | 5/2006 | Saberan | B60R 21/232 |
| | | | 280/730.2 |
| 2018/0281736 A1 | 10/2018 | Suzuki | |

FOREIGN PATENT DOCUMENTS

| | | |
|---|---|---|
| KR | 20210083515 A | 7/2021 |
| KR | 20220063509 A | 5/2022 |

* cited by examiner

AIRBAG APPARATUS FOR VEHICLE

CROSS-REFERENCE TO RELATED APPLICATIONS

This application claims the benefit of Korean Patent Application No. 10-2022-0122297, filed on Sep. 27, 2022, which application is hereby incorporated herein by reference.

TECHNICAL FIELD

The disclosure relates to an airbag apparatus for a vehicle.

BACKGROUND

In general, vehicles are provided with various types of airbag devices for protecting occupants from accidents such as collisions and rollovers.

Among the airbag devices, there are roof airbag devices mounted on roofs of vehicles, and among the roof airbag devices, there is a roof airbag device having a roof cushion that is deployed to protrude from a roof toward a lower side of a vehicle compartment.

The roof cushion, which protrudes from the roof toward the lower side of the vehicle compartment when deployed, is located in front of an occupant and may support and protect the occupant moving forward due to an impact caused by a vehicle accident.

However, because the roof cushion protruding from the roof toward the lower side of the vehicle compartment has poor self-supporting capability, and thus may be easily pushed forward by a weight of an occupant moving forward due to an impact of an accident, the roof cushion may not properly perform its role of protecting the occupant.

SUMMARY

An embodiment of the disclosure provides an airbag apparatus for a vehicle capable of effectively enhancing a supporting force of a roof cushion of a roof airbag device that is deployed to protrude from a roof toward a lower side of a vehicle compartment.

Additional features of embodiments of the disclosure will be set forth in part in the description which follows and, in part, will be obvious from the description, or may be learned by practice of the disclosure.

In accordance with an embodiment of the disclosure, an airbag apparatus for a vehicle includes a roof airbag device including a roof cushion mounted on a roof of a vehicle body and protruding toward a lower side of a vehicle compartment when deployed, a curtain airbag device including a curtain cushion mounted on the vehicle body around a side window to cover the side window when deployed, and a coupling unit provided to couple the roof cushion to be supported on the curtain cushion.

The airbag apparatus for the vehicle may further include a fixing bracket fixed to the vehicle body between the roof airbag device and the curtain airbag device, wherein the coupling unit may connect the roof cushion and the curtain cushion in a detachable state and may be connected to the fixing bracket in a detachable state.

The airbag apparatus for the vehicle may further include a forward collision detection sensor provided to detect a forward collision of the vehicle, a lateral collision detection sensor provided to detect a lateral collision of the vehicle, a first inflator provided to deploy the roof cushion by supplying airbag gas, a second inflator provided to deploy the curtain cushion by supplying airbag gas, and a processor provided to operate the first inflator and the second inflator based on a forward collision signal and a lateral collision signal detected through the forward collision detection sensor and the lateral collision detection sensor, wherein the processor may execute a simultaneous deployment mode in which the roof cushion and the curtain cushion are simultaneously deployed in a state in which at least one of the forward collision signal and the lateral collision signal is detected, and in the simultaneous deployment mode, the coupling unit may be separated from the fixing bracket while keeping a state in which the roof cushion and the curtain cushion are connected.

The airbag apparatus for the vehicle may further include a fixing bracket fixed to the vehicle body between the roof airbag device and the curtain airbag device, wherein the coupling unit may connect the roof cushion and the curtain cushion to the fixing bracket in a detachable state.

The airbag apparatus for the vehicle may further include a forward collision detection sensor provided to detect a forward collision of the vehicle, a lateral collision detection sensor provided to detect a lateral collision of the vehicle, a first inflator provided to deploy the roof cushion by supplying airbag gas, a second inflator provided to deploy the curtain cushion by supplying airbag gas, and a processor provided to operate the first inflator and the second inflator based on a forward collision signal and a lateral collision signal detected through the forward collision detection sensor and the lateral collision detection sensor, wherein the processor may execute a first independent deployment mode in which the curtain cushion is independently deployed in a state in which the lateral collision signal is detected without the forward collision signal, and in the first independent deployment mode, the coupling unit may separate the curtain cushion from the fixing bracket in a state in which the roof cushion is fixed to the fixing bracket.

The processor may execute a second independent deployment mode in which the roof cushion is independently deployed in a state in which the forward collision signal is detected after the first independent deployment mode, and in the second independent deployment mode, the coupling unit may separate the roof cushion from the fixing bracket.

The roof airbag device may further include a first housing provided to accommodate the roof cushion in a state before deployment, the curtain airbag device may further include a first housing provided to accommodate the curtain cushion in a state before deployment, and the coupling unit may include a first tether having one end coupled to the roof cushion and the other end drawn out of the first housing and a second tether having one end coupled to the curtain cushion to be connected to the first tether and having the other end drawn out of the second housing.

The airbag apparatus for the vehicle may further include a fixing bracket fixed to the vehicle body between the first housing and the second housing, wherein the coupling unit may include a first coupling member to which the first tether is connected and detachably coupled to the fixing bracket and a second coupling member to which the second tether is connected and detachably coupled to the first coupling member.

A deployment mode of the roof cushion and the curtain cushion may include a simultaneous deployment mode in which the roof cushion and the curtain cushion are simultaneously deployed, and in the simultaneous deployment mode, the first coupling member and the second coupling member may be kept in a state of being connected to each other, and the first coupling member may be separated from the fixing bracket.

A deployment mode of the roof cushion and the curtain cushion may include a first independent deployment mode in which the curtain cushion is independently deployed in a state in which the roof cushion is not deployed, and in the first independent deployment mode, the first coupling member may be kept in a state of being connected to the fixing bracket, and the second coupling member may be separated from the first coupling member.

The deployment mode of the roof cushion and the curtain cushion may further include a second independent deployment mode in which the roof cushion is independently deployed after the first independent deployment mode, and in the second independent deployment mode, the first coupling member may be separated from the fixing bracket.

The first coupling member may have a ring-shaped opening provided to be opened elastically and is coupled to the fixing bracket so that the opening faces downward.

The first coupling member may be coupled to one surface of the fixing bracket facing the second housing.

The curtain airbag device may be configured as a pair to correspond to a pair of the side windows disposed on both sides of the vehicle, the roof airbag device may be mounted between a pair of the curtain airbag devices along a width direction of the vehicle, and the coupling unit may be configured as a pair to couple opposite ends of the roof cushion in the width direction of the vehicle to be supported on a pair of the curtain cushions, respectively.

The roof airbag device may further include a first housing provided to accommodate the roof cushion in a state before deployment, the curtain airbag device may further include a first housing provided to accommodate the curtain cushion in a state before deployment, the first housing may be mounted on the roof along a width direction of the vehicle, the second housing may be mounted on the vehicle body along a boundary between the roof and a pillar of the vehicle, in a state in which the roof cushion and the curtain cushion are deployed, a lower end of the roof cushion may be located lower than a lower end of the curtain cushion, and the coupling unit may couple a side end of the roof cushion in the deployed state to the lower end of the curtain cushion in the deployed state.

The roof cushion may be packaged in the first housing in a state in which a lower part thereof is tucked in inward of an upper part thereof and folded in a vertical direction so that a tucked-in point forms a lower end thereof, the curtain cushion may be packaged in the second housing in the state of being folded in the vertical direction so that a position of a lower end thereof is kept, a starting end of the first tether may be fixed to the tucked-in point of the roof cushion, and a starting end of the second tether may be fixed to a lower end of the curtain cushion.

BRIEF DESCRIPTION OF THE DRAWINGS

These and/or other features of embodiments of the disclosure will become apparent and more readily appreciated from the following description of the embodiments, taken in conjunction with the accompanying drawings, of which.

DETAILED DESCRIPTION OF ILLUSTRATIVE EMBODIMENTS

Figure 1:
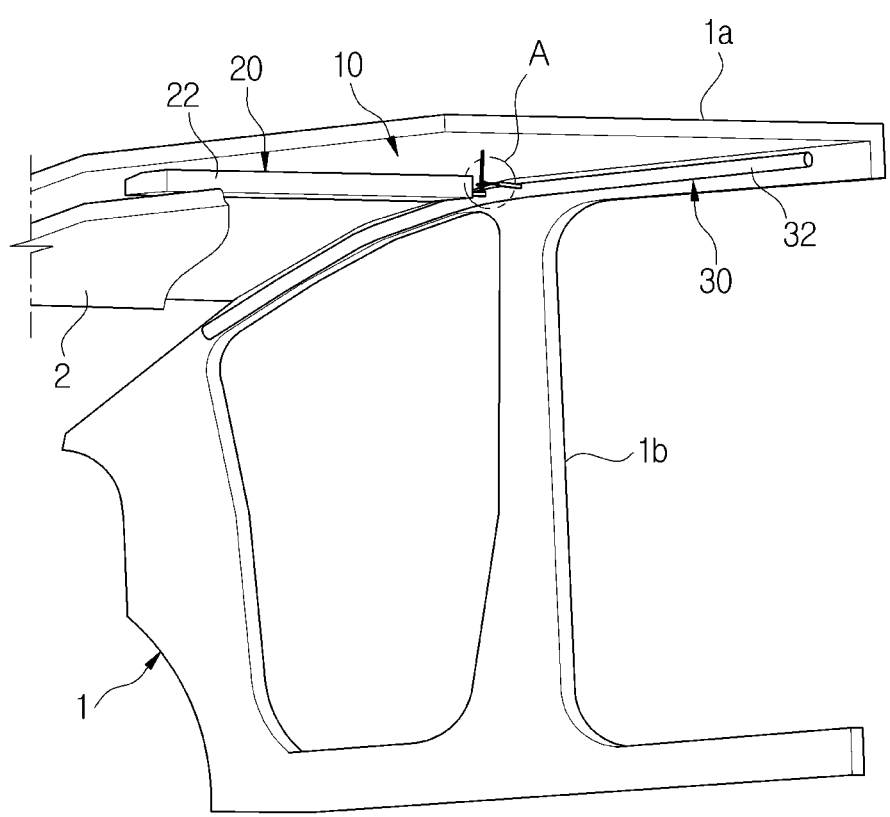
FIG. 1 illustrates a state in which an airbag apparatus for a vehicle according to an embodiment of the disclosure is installed on a vehicle body.
Figure 2:
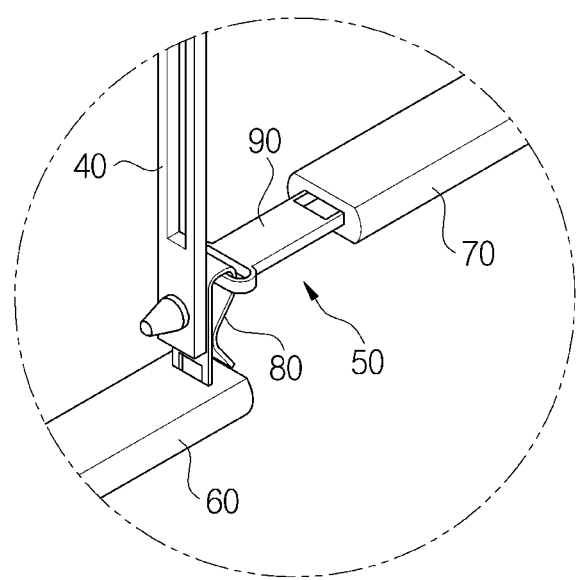
FIG. 2 is an enlarged view of part 'A' in FIG. 1.
Figure 3:
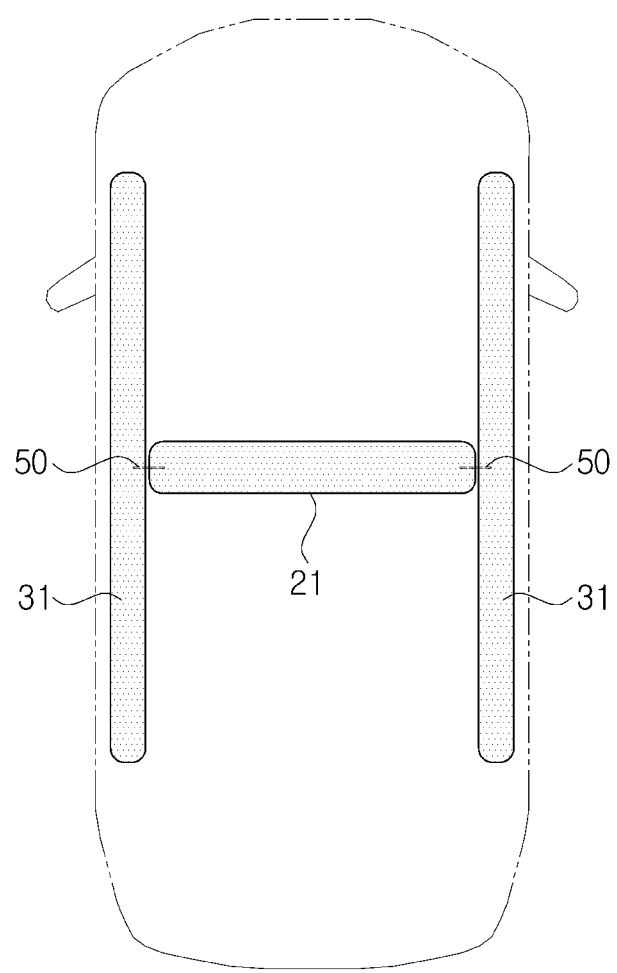
FIG. 3 is a schematic plan view of the vehicle to which the airbag apparatus for the vehicle according to an embodiment of the disclosure is applied, illustrating a state in which a roof cushion and a curtain cushion are deployed.
Figure 4:
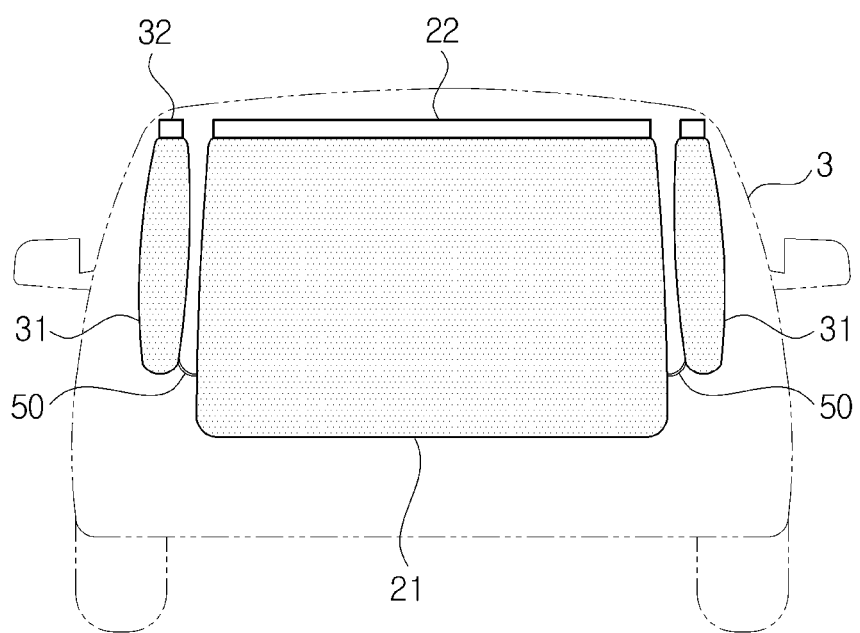
FIG. 4 is a schematic front view of the vehicle to which the airbag apparatus for the vehicle according to an embodiment of the disclosure is applied, illustrating the state in which the roof cushion and the curtain cushion are deployed.

Throughout the specification, like reference numerals refer to like elements. This specification does not describe all factors of embodiments, and duplicative contents between general contents or embodiments in the technical field of the disclosure will be omitted. The terms 'member,' 'unit,' 'module,' and 'device' used in this specification may be embodied as software or hardware, and it is also possible for a plurality of 'members,' 'units,' 'modules,' and 'devices' to be embodied as one component, or one 'member,' 'unit,' 'module,' and 'device' to include a plurality of components according to the embodiments.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

Throughout the specification, when an element is referred to as being located "on" or "over" another element, this includes not only a case in which an element is in contact with another element but also a case in which another element exists between the two elements.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, operating principles and embodiments of the disclosure will be described with reference to the accompanying drawings.

As illustrated in FIGS. 1 to 4, an airbag apparatus 10 for a vehicle according to an embodiment includes a roof airbag device 20 and a curtain airbag device 30.

The roof airbag device 20 is mounted on a roof 1a of a vehicle body 1 and may include a roof cushion 21 protruding toward a lower side of a vehicle compartment when deployed.

The roof cushion 21 may be placed in front of an occupant by being deployed to protrude toward the lower side of the vehicle compartment in case of a forward collision of the vehicle. In case of the forward collision of the vehicle, the occupant moves forward, and at this time, the roof cushion 21 may support and protect the occupant moving forward.

The vehicle may include an autonomous vehicle whose development is currently being accelerated as well as a general vehicle.

Because the autonomous vehicle may be driven without the driver directly driving, occupants in front and rear seats may be seated to face each other.

When the roof airbag device 20 is employed in the autonomous vehicle such that the roof cushion 21 is deployed between the front seat and the rear seat disposed to face each other, the roof airbag device 20 may perform a function of protecting both the front occupant and the rear occupant in the event of a vehicle collision.

The curtain airbag device 30 is mounted around a side window of the vehicle and may include a curtain cushion 31 to cover the side window when deployed. The curtain cushion 31 may be deployed to cover all or part of the side window.

The curtain airbag devices 30 may be configured as a pair to correspond to a pair of the side windows disposed on opposite sides of the vehicle. Reference numeral 3 in FIG. 4 indicates a position of the side window.

A deployment operation of the curtain cushion 31 to cover the side window may be performed in the event of a side collision of the vehicle. An occupant moving toward the side window due to the side collision of the vehicle may be protected by contacting the deployed curtain cushion 31.

The roof airbag device 20 and the curtain airbag device 30 may include a first housing 22 and a second housing 32, respectively. The roof cushion 21 and the curtain cushion 31 are accommodated in the first housing 22 and the second housing 32 in folded states, respectively, and may be drawn out and deployed to the outside of the housings 22 and 32 while inflating by receiving an airbag gas pressure when a vehicle impact occurs.

The first housing 22 may be mounted on the roof 1a of the vehicle body 1 between a pair of the second housings 32 along a width direction of the vehicle, and the second housing 32 may be mounted on the vehicle body 1 along a boundary between the roof 1a and a pillar 1b.

Referring to FIGS. 1 to 6, the roof airbag device 20 and the curtain airbag device 30 may include inflators 23 and 33 that generate airbag gas, respectively. The inflators 23 and 33 may be connected to the cushions 21 and 31 to inject airbag gas into the cushions 21 and 31, respectively.

The inflators 23 and 33 may include the first inflator 23 installed on the roof airbag device 20 and the second inflator 33 installed on the curtain airbag device 30.

The airbag apparatus 10 for the vehicle may include a coupling unit 50 provided to couple the roof cushion 21 to be supported on the curtain cushion 31.

The coupling unit 50 may enhance a supporting force of the roof cushion 21 in a deployed state by allowing the deployed roof cushion 21 to be supported on the curtain cushion 31 deployed to be supported on the vehicle body 1.

Because the roof cushion 21 with the enhanced supporting force enhances an occupant restraint force restraining the occupant by being suppressed from being pushed forward by the occupant moving forward in the event of the forward collision of the vehicle, the roof cushion 21 may more effectively perform an action of cushioning an impact applied to the occupant.

The coupling units 50 are configured as a pair and may couple opposite ends of the roof cushion 21 in the width direction of the vehicle to be supported on the pair of curtain cushions 31, respectively.

The coupling unit 50 may include a first tether 60 coupled to the roof cushion 21 and a second tether 70 coupled to the curtain cushion 31.

The first tether 60 is provided to have one end coupled to the roof cushion 21 and the other end drawn out of the first housing 22, and the second tether 70 is provided to have one end coupled to the curtain cushion 31 and the other end drawn out of the second housing 32 and may be connected to the first tether 60. The first tether 60 and the second tether 70 may be sewn and fixed to the corresponding cushions 21 and 31 through the one ends, respectively.

The curtain cushion 31 may protect an upper side of an upper body including a head and shoulder of an occupant in a state of being deployed to cover the side window. The roof cushion 21 may entirely protect a front surface of the upper body including a chest and abdomen of the occupant by having a lower end positioned lower than a lower end of the curtain cushion 31 in the deployed state.

Figure 5:
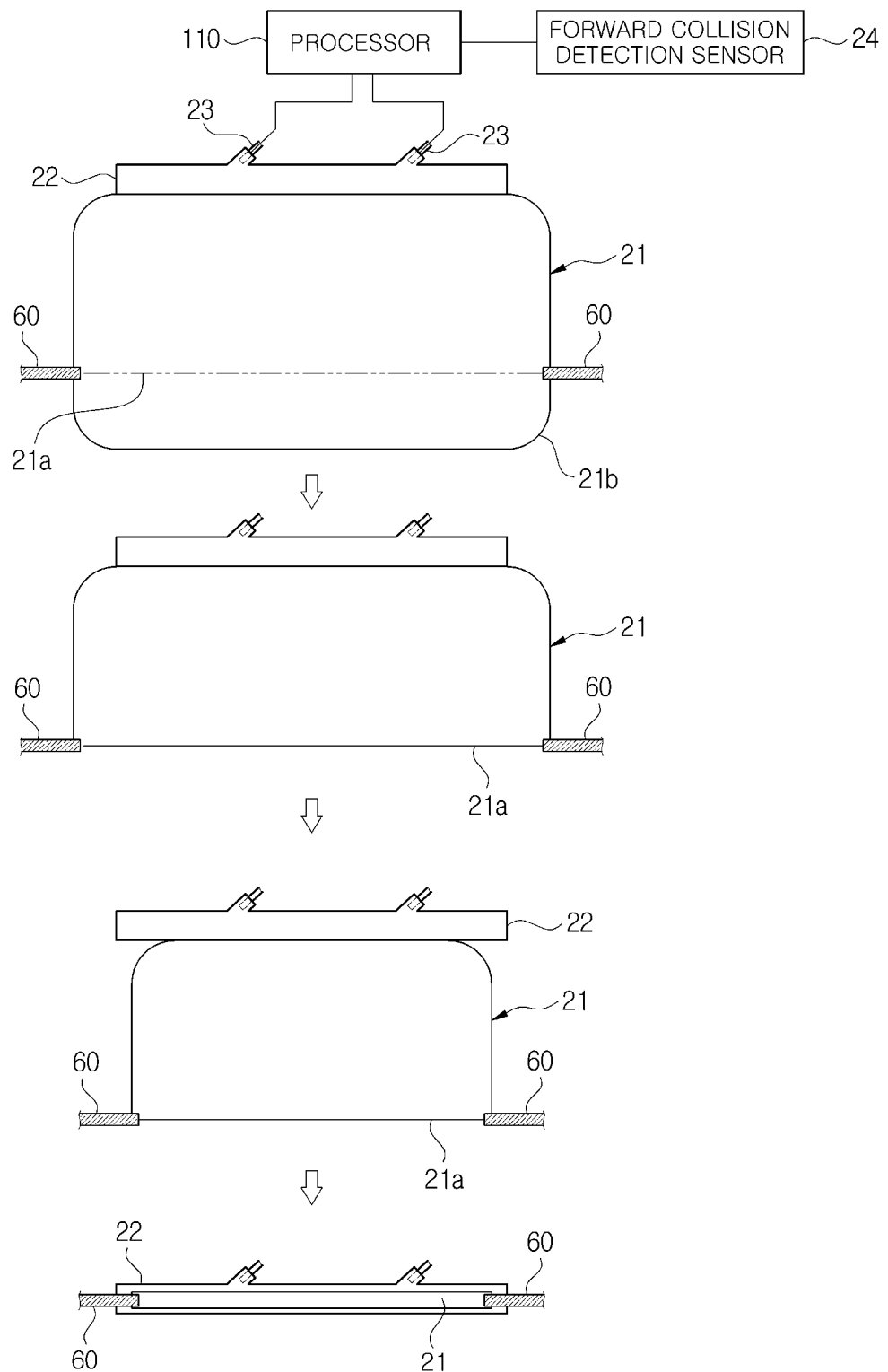
FIG. 5 illustrates a process in which the roof cushion is packaged in a first housing of a roof airbag device in the airbag apparatus for the vehicle according to an embodiment of the disclosure.
Figure 6:
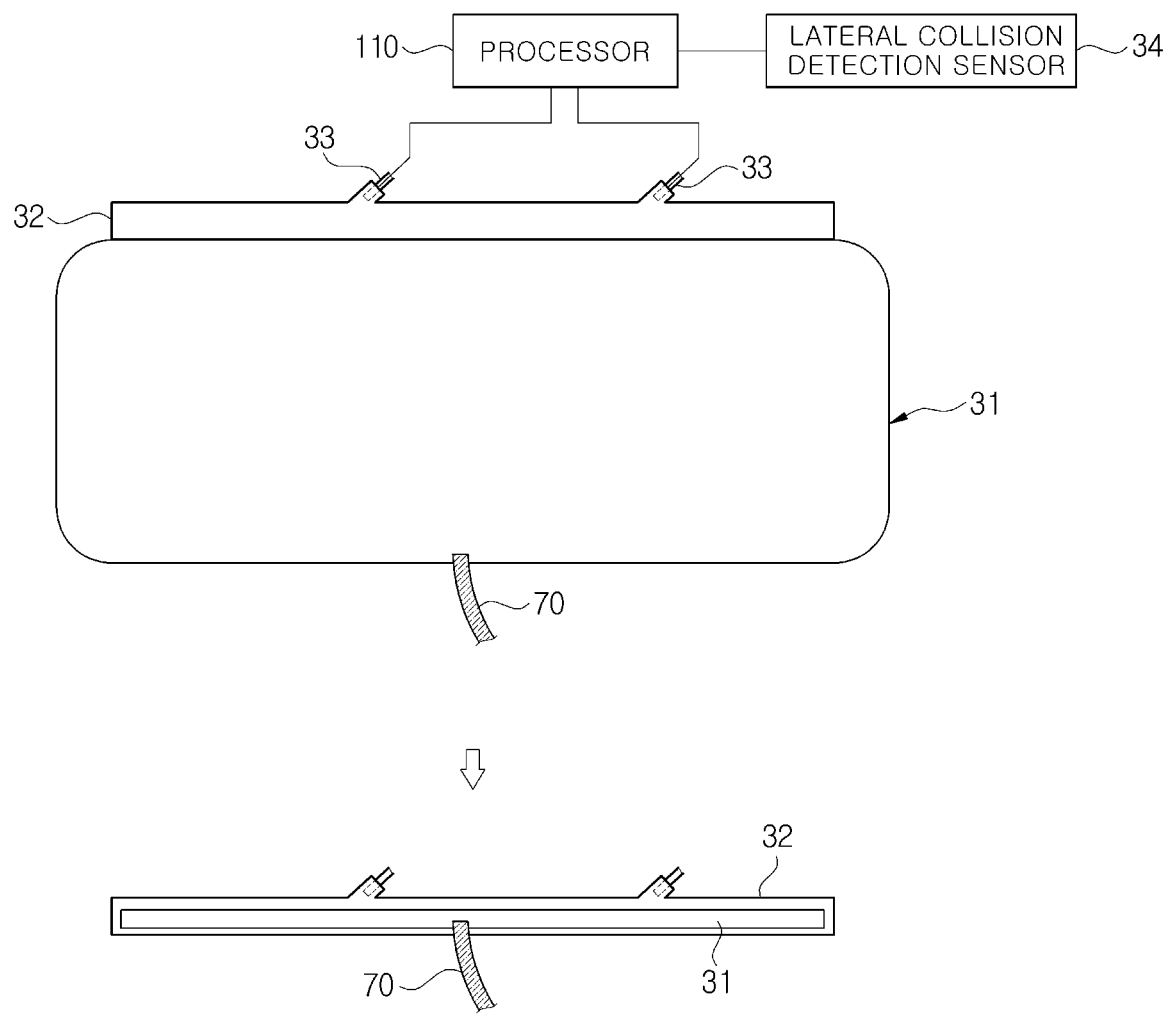
FIG. 6 illustrates a process in which the curtain cushion is packaged in a second housing of a curtain airbag device in the airbag apparatus for the vehicle according to an embodiment of the disclosure.

FIGS. 5 and 6 illustrate folding structures of the roof cushion 21 and the curtain cushion 31. As illustrated in FIG. 5, considering a length of the roof cushion 21 in a vertical direction is formed relatively longer than a length of the curtain cushion 31, the roof cushion 21 may be packaged to be accommodated in the first housing 22 in a state in which a lower part thereof is tucked in inward of an upper part thereof and folded in a vertical direction so that a tucked-in point 21a forms a lower end thereof.

The lower part tucked in inward of the upper part of the roof cushion 21 forms a tucked-in portion 21b, and in the roof cushion 21, the tucked-in point 21a may be a boundary between the upper part where the tucked-in portion 21b is tucked in and the tucked-in portion 21b.

The first tether 60 may be kept in a state of being connected to the second tether 70 without interfering with a deployment operation of the roof cushion 21 by having a starting end fixed to the tucked-in point 21a of the roof cushion 21. The first tether 60 may be fixed to a side end of the roof cushion 21 so that lengths of the first tether 60 and the second tether 70 may be shortened as much as possible.

When a length of the first housing 22 in a longitudinal direction of the vehicle is shorter than the length of the roof cushion 21, the roof cushion 21 may be laterally compressed before or after being folded in the vertical direction.

As illustrated in FIG. 6, the curtain cushion 31 may be packaged to be accommodated in the second housing 32 in the state of being folded in the vertical direction so that the position of the lower end thereof is kept. The curtain cushion 31 may be folded to form a Z shape in a zigzag manner when folded.

The second tether 70 may be kept in a state of being connected to the first tether 60 without interfering with a deployment operation of the curtain cushion 31 by having a starting end fixed to the lower end of the curtain cushion 31. Therefore, the coupling unit 50 may stably couple the side end of the roof cushion 21 in the deployed state to the lower end of the curtain cushion 31 in the deployed state.

The folded cushions 21 and 31 may be taped to be kept in the folded state until deployed and accommodated in corresponding housings 22 and 32.

A cover trim 2 may be installed inside the first housing 22 and the second housing 32 in the direction of the vehicle compartment to prevent the housings 22 and 32 in which the cushions 21 and 31 are accommodated from being exposed to the outside (see FIG. 1).

The airbag apparatus 10 for the vehicle also includes a fixing bracket 40 fixed to the vehicle body 1 between the first housing 22 and the second housing 32, and the coupling unit 50 may be connected to the fixing bracket 40 in a detachable state to keep the roof cushion 21 and the curtain cushion 31 in a coupled state even when deployed.

The first inflator 23 of the roof airbag device 20 may operate in a state in which a forward collision of the vehicle is detected through a forward collision detection sensor 24 to detect a forward collision of the vehicle.

The forward collision detection sensor 24 may transmit a forward collision detection signal of the vehicle to a processor 110, and the processor 110 may operate the first inflator 23 based on the forward collision detection signal received through the forward collision detection sensor 24.

The second inflator 33 of the curtain airbag device 30 may operate in a state in which a lateral collision of the vehicle is detected through a lateral collision detection sensor 34 to detect the lateral collision of the vehicle.

The lateral collision detection sensor 34 may transmit a lateral collision detection signal of the vehicle to the processor 110, and the processor 110 may operate the second inflator 33 based on the lateral collision detection signal received through the lateral collision detection sensor 34.

The processor 110 may simultaneously operate the first inflator 23 and the second inflator 33 to deploy the roof cushion 21 and the curtain cushion 31 together in a state in which at least one of the forward collision signal and the lateral collision signal is detected.

Accordingly, a deployment mode of the roof cushion 21 and the curtain cushion 31 executed by the processor 110 may include a simultaneous deployment mode in which the roof cushion 21 and the curtain cushion 31 are simultaneously deployed and an independent deployment mode in which one of the roof cushion 21 and the curtain cushion 31 is independently deployed.

The processor 110 may execute the simultaneous deployment mode in the state in which at least one of the forward collision signal and the lateral collision signal is detected. In this case, the coupling unit 50 may be separated from the fixing bracket 40 in a state of keeping the connection of the roof cushion 21 and the curtain cushion 31 so that the roof cushion 21 and the curtain cushion 31 that are deployed are kept in a mutually coupled state. Therefore, the roof cushion 21 may be stably supported through the curtain cushion 31 deployed together even when a lateral collision as well as a forward collision occurs.

The coupling unit 50 may also connect the roof cushion 21 and the curtain cushion 31 in a detachable state and be connected to the fixing bracket 40 in the detachable state.

The independent deployment mode includes a first independent deployment mode in which the curtain cushion 31 is independently deployed, and the processor 110 may execute the first independent deployment mode in a state in which the lateral collision signal is detected without the forward collision signal.

In this case, the coupling unit 50 may separate the curtain cushion 31 from the fixing bracket 40 in a state in which the roof cushion 21 is fixed to the fixing bracket 40 so that the occupant is protected in the event of the lateral collision of the vehicle by the independently deployed curtain cushion 31.

The independent deployment mode also includes a second independent deployment mode in which the roof cushion 21 is independently deployed after the first independent deployment mode, and the processor 110 may execute the second independent deployment mode in which the roof cushion 21 is independently deployed in a state where the forward collision signal is detected after the first independent deployment mode. In this case, the coupling unit 50 may separate the roof cushion 21 from the fixing bracket 40 so that the occupant is protected in the event of the forward collision of the vehicle.

As such, according to the structure in which the coupling unit 50 connects the roof cushion 21 and the curtain cushion 31 in the detachable state and is connected to the fixing bracket 40 in the detachable state, in various deployment modes of the roof cushion 21 and the curtain cushion 31, the deployment operation of the cushions 21 and 31 may be ensured to be smooth.

The coupling unit 50 includes a first coupling member 80 to which the first tether 60 is connected and detachably coupled to the fixing bracket 40 and a second coupling member 90 to which the second tether 70 is connected and detachably coupled to the first coupling member 80, and thus may connect the first tether 60 and the second tether 70 to the fixing bracket 40 in a detachable state.

Figure 7:
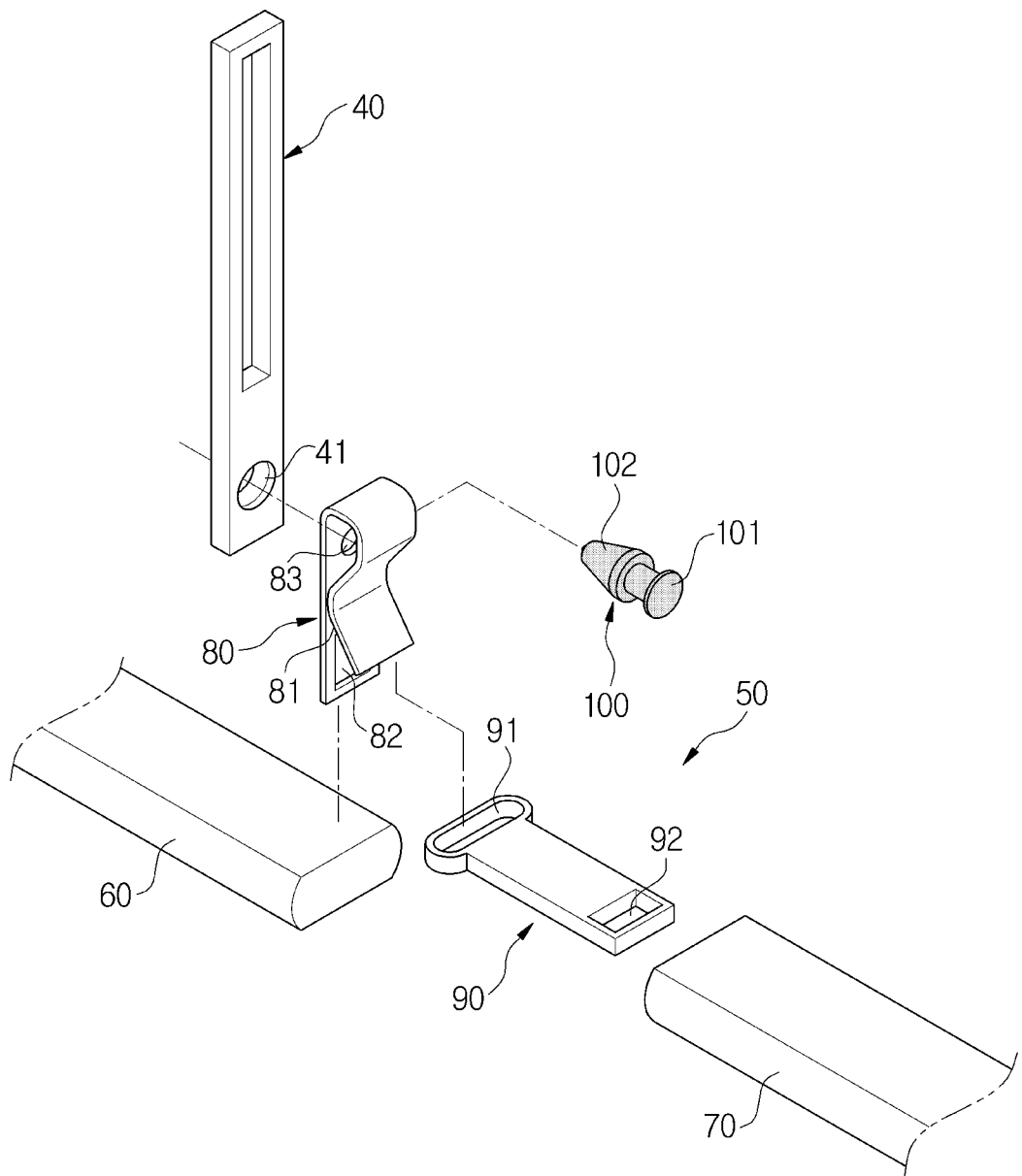
FIG. 7 is an exploded perspective view of a coupling unit of the airbag apparatus for the vehicle according to an embodiment of the disclosure.
Figure 8:
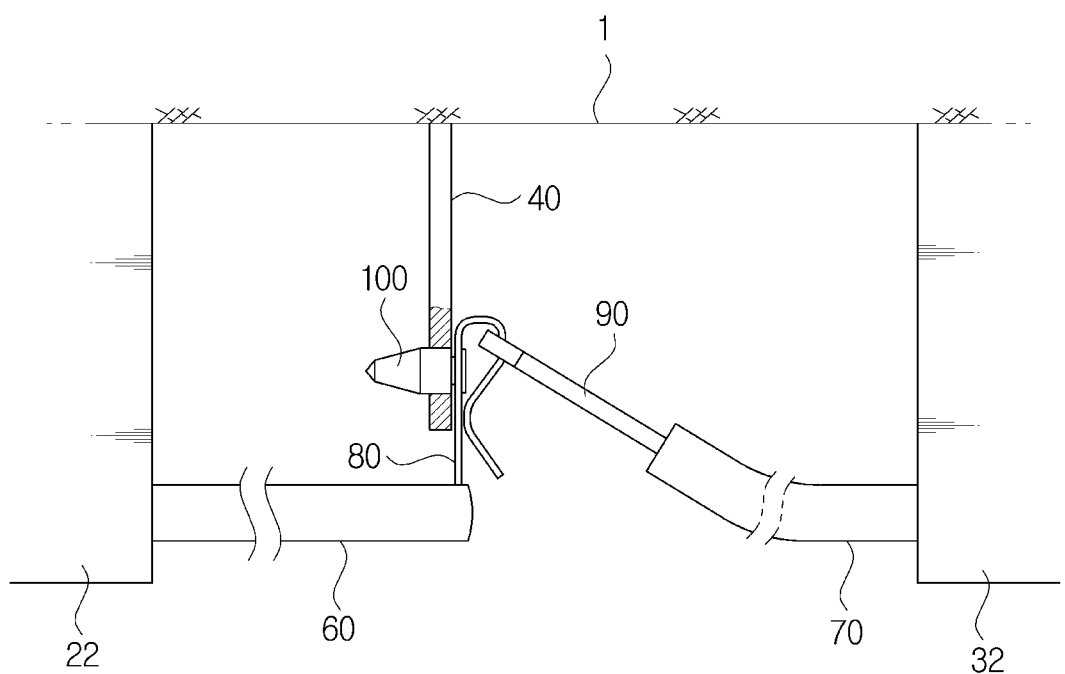
FIG. 8 is a view of a main part of the airbag apparatus for the vehicle according to an embodiment of the disclosure, illustrating a state before deployment of the roof cushion and the curtain cushion.

As illustrated in FIGS. 7 and 8, the fixing bracket 40 has a fastening hole 41 at a lower portion and thus may be welded to the vehicle body 1 through an upper end.

The first coupling member 80 is provided with a ring-shaped opening 81 that may be elastically opened and may be coupled to one surface of the fixing bracket 40 facing the second housing 32 in a state in which the opening 81 faces downward.

A fixing hole 82 for fixing the first tether 60 may be provided at one side of the opening 81 of the first coupling member 80. The first tether 60 may be fixed to the fixing hole 82 by being sewn in a state in which an end thereof is wound to be caught in the fixing hole 82. The fixing hole 82 may be a first fixing hole.

The first coupling member 80 may be detachably coupled to the fixing bracket 40 through a fastening member 100. A coupling hole 83 to which a head part 101 of the fastening member 100 is coupled to be caught thereon is provided on one side of a circumference of the first coupling member 80, and the first coupling member 80 may be coupled to the fixing bracket 40 in a detachable state as an insertion part 102 of the fastening member 100 is fastened to the fastening hole 41 of the fixing bracket 40.

One side surface of the first coupling member 80 supported on the fixing bracket 40 may be provided to be flat so that the first coupling member 80 is stably supported on an outer surface of the fixing bracket 40, and the other side surface of the first coupling member 80 may be processed to be rounded so that a coupling hole 91 of the second coupling member 90, which will be described later, is smoothly fastened into the opening 81.

The coupling hole 91 and a fixing hole 92 may be provided in a plate shape at both ends of the second coupling member 90, respectively.

An end of the second tether 70 may be sewn in a wound state to be caught in the fixing hole 92 so as to be fixed to the fixing hole 92. The fixing hole 92 may be a second fixing hole.

The second coupling member 90 may be connected to the first coupling member 80 as the coupling hole 91 side is inserted into the opening 81 of the first coupling member 80 and may be separated from the first coupling member 80 as the coupling hole 91 side comes out of the opening 81 of the first coupling member 80.

Figure 9:
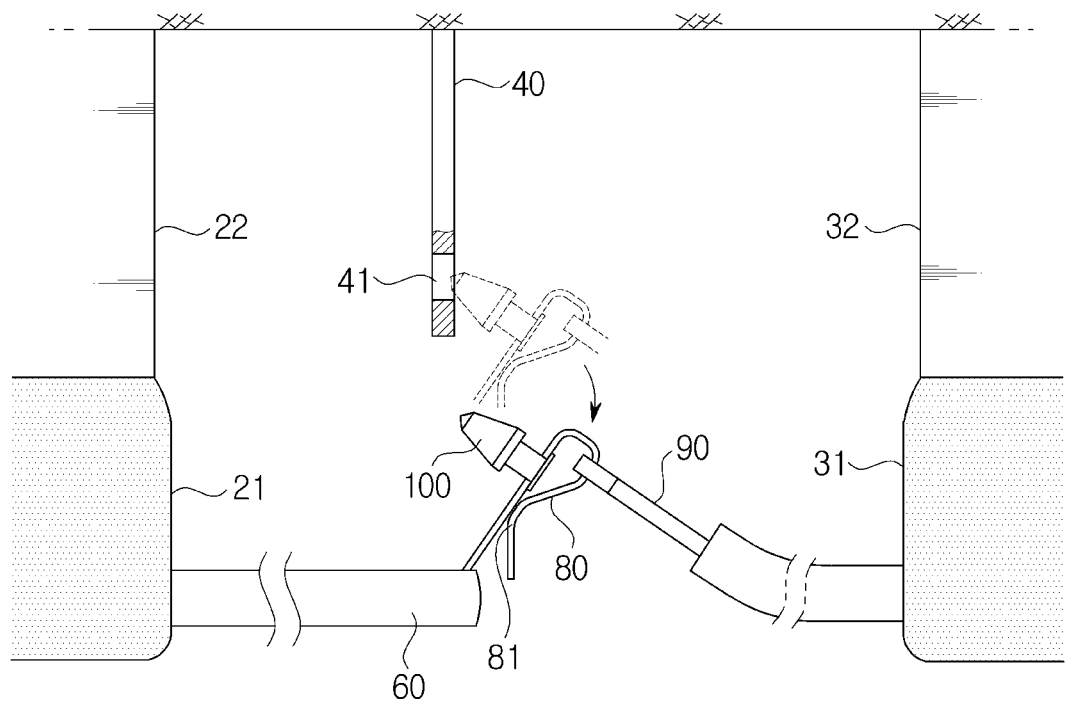
FIG. 9 is a view of the main part of the airbag apparatus for the vehicle according to an embodiment of the disclosure, illustrating that the roof cushion and the curtain cushion are being deployed simultaneously.

FIG. 9 illustrates an operation of the coupling unit 50 in the simultaneous deployment mode. As illustrated in FIG. 9, when the processor 110 executes the simultaneous deployment mode, the roof cushion 21 of the first housing 22 and the curtain cushion 31 of the second housing 32 may be simultaneously deployed downward.

At this time, the first coupling member 80 and the second coupling member 90 may be simultaneously pulled downward through the first tether 60 and the second tether 70 in a mutually connected state, and the fastening member 100 may be separated from the fastening hole 41 by receiving a force in a direction opposite to a direction of being fastened to the fastening hole 41.

Therefore, the first coupling member 80 may be separated from the fixing bracket 40 while being kept in a state of being connected with the second coupling member 90 so that the roof cushion 21 and the curtain cushion 31 are smoothly deployed in the state of being connected to each other through the coupling unit 50.

Figure 10:
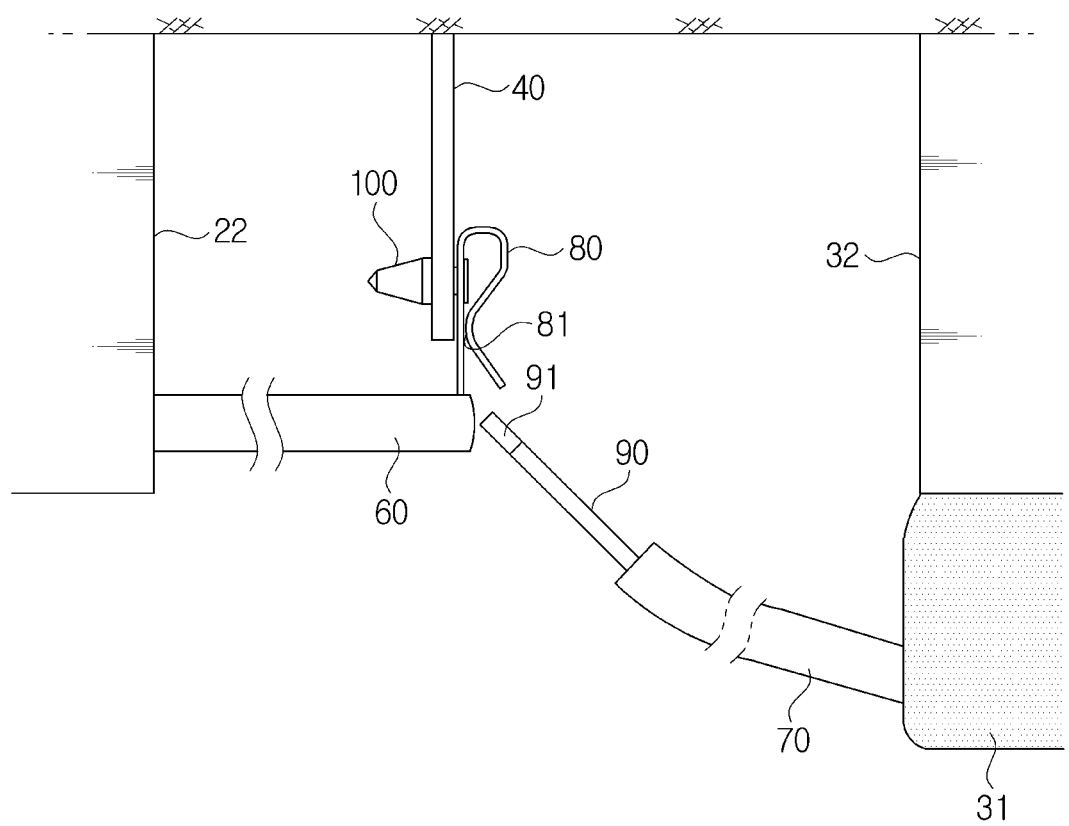
FIG. 10 is a view of the main part of the airbag apparatus for the vehicle according to an embodiment of the disclosure, illustrating that the curtain cushion is being deployed.

FIG. 1 illustrates an operation of the coupling unit 50 in the first independent deployment mode. As illustrated in FIG. 10, when the processor 110 executes the first independent deployment mode, the curtain cushion 31 accommodated in the second housing 32 may be deployed downward in a state in which the roof cushion 21 is accommodated in the first housing 22.

At this time, the second coupling member 90 may be separated from the first coupling member 80 while being pulled downward by the second tether 70 so that the coupling hole 91 side escapes from the opening 81 of the first coupling member 80.

In the process of separating the second coupling member 90 as described above, because a force is applied to the first coupling member 80 in a downward direction crossing the fastening direction of the fastening member 100 fastened to the fastening hole 41, the first coupling member 80 may be kept in a state of being fixed to the fixing bracket 40.

Figure 11:
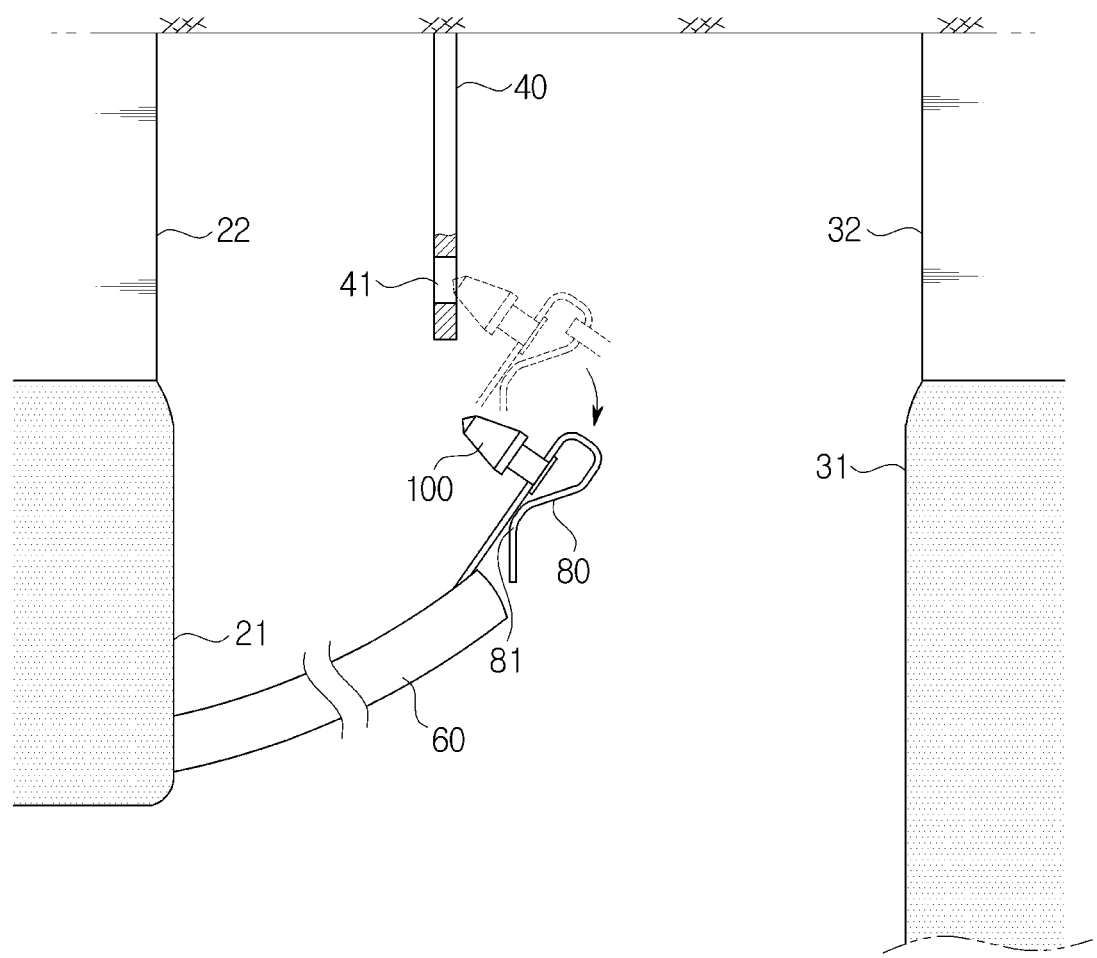
FIG. 11 is a view of the main part of the airbag apparatus for the vehicle according to an embodiment of the disclosure, illustrating that the roof cushion is being deployed in a state in which the curtain cushion is deployed.

FIG. 11 illustrates an operation of the coupling unit 50 in the second independent deployment mode that is executed after the first independent deployment mode. As illustrated in FIG. 11, when the processor 110 executes the second independent deployment mode, the roof cushion 21 of the first housing 22 may be deployed downward.

At this time, the first tether 60 may separate the fastening member 100 from the fastening hole 41 by rotating the first coupling member 80 toward the second housing 32 while pulling the first coupling member 80 downward. Therefore, the first coupling member 80 may be separated from the bracket 40 so that the roof cushion 21 may be smoothly deployed.

As is apparent from the above, according to embodiments of the disclosure, an airbag apparatus for a vehicle capable of effectively enhancing a supporting force of a roof cushion of a roof airbag device that is deployed to protrude from a roof toward a lower side of a vehicle compartment can be provided.

What is claimed is:

1. An airbag apparatus for a vehicle, the airbag apparatus comprising:
   a roof airbag device comprising a roof cushion mounted on a roof of a vehicle body and protruding toward a lower side of a vehicle compartment in a deployed state;
   a curtain airbag device comprising a curtain cushion mounted on the vehicle body around a side window to cover the side window in the deployed state;
   a coupling unit configured to couple the roof cushion to be supported on the curtain cushion; and
   a fixing bracket fixed to the vehicle body between the roof airbag device and the curtain airbag device, wherein the coupling unit connects the roof cushion and the curtain cushion in a detachable state and is connected to the fixing bracket in a detachable state.

2. The airbag apparatus according to claim 1, further comprising:
   a forward collision detection sensor configured to detect a forward collision of the vehicle;
   a lateral collision detection sensor configured to detect a lateral collision of the vehicle;
   a first inflator configured to deploy the roof cushion by supplying a first airbag gas;
   a second inflator configured to deploy the curtain cushion by supplying a second airbag gas; and
   a processor configured to operate the first inflator and the second inflator based on a forward collision signal and a lateral collision signal detected through the forward collision detection sensor and the lateral collision detection sensor.

3. The airbag apparatus according to claim 2, wherein the processor is configured to execute a simultaneous deployment mode in which the roof cushion and the curtain cushion are simultaneously deployed in a state in which the forward collision signal or the lateral collision signal is detected, and wherein, in the simultaneous deployment mode, the coupling unit is separated from the fixing bracket while keeping a state in which the roof cushion and the curtain cushion are connected.

4. The airbag apparatus according to claim 1, wherein:
   the curtain airbag device is configured as a pair of curtain airbag devices to correspond to a pair of the side windows disposed on both sides of the vehicle;
   the roof airbag device is mounted between the pair of curtain airbag devices along a width direction of the vehicle; and
   the coupling unit is configured as a pair of coupling units to couple opposite ends of the roof cushion in the width direction of the vehicle to be supported on a pair of the curtain cushions, respectively.

5. The airbag apparatus according to claim 1, wherein:
   the roof airbag device further comprises a first housing configured to accommodate the roof cushion in a state before deployment;
   the curtain airbag device further comprises a second housing configured to accommodate the curtain cushion in the state before deployment;
   the first housing is mounted on the roof along a width direction of the vehicle;

the second housing is mounted on the vehicle body along a boundary between the roof and a pillar of the vehicle;

in a state in which the roof cushion and the curtain cushion are in the deployed state, a lower end of the roof cushion is located lower than a lower end of the curtain cushion; and the coupling unit couples a side end of the roof cushion in the deployed state to the lower end of the curtain cushion in the deployed state.

6. The airbag apparatus according to claim 5, wherein:

the roof cushion is packaged in the first housing in a state in which a lower part thereof is tucked in inward of an upper part thereof and folded in a vertical direction so that a tucked-in point defines a lower end thereof;

the curtain cushion is packaged in the second housing in a state of being folded in the vertical direction so that a position of a lower end thereof is kept;

a starting end of a first tether is fixed to the tucked-in point of the roof cushion; and a starting end of a second tether is fixed to the lower end of the curtain cushion.

7. An airbag apparatus for a vehicle, the airbag comprising:

a roof airbag device comprising a roof cushion mounted on a roof of a vehicle body and protruding toward a lower side of a vehicle compartment in a deployed state;

a curtain airbag device comprising a curtain cushion mounted on the vehicle body around a side window to cover the side window in the deployed state;

a coupling unit configured to couple the roof cushion to be supported on the curtain cushion; and a fixing bracket fixed to the vehicle body between the roof airbag device and the curtain airbag device, wherein the coupling unit connects the roof cushion and the curtain cushion to the fixing bracket in a detachable state.

8. The airbag apparatus according to claim 7, further comprising:

a forward collision detection sensor configured to detect a forward collision of the vehicle;

a lateral collision detection sensor configured to detect a lateral collision of the vehicle;

a first inflator configured to deploy the roof cushion by supplying a first airbag gas;

a second inflator configured to deploy the curtain cushion by supplying a second airbag gas; and a processor configured to operate the first inflator and the second inflator based on a forward collision signal and a lateral collision signal detected through the forward collision detection sensor and the lateral collision detection sensor.

9. The airbag apparatus according to claim 8, wherein the processor is configured to execute a first independent deployment mode in which the curtain cushion is independently deployed in a state in which the lateral collision signal is detected without the forward collision signal, and wherein, in the first independent deployment mode, the coupling unit is configured to separate the curtain cushion from the fixing bracket in a state in which the roof cushion is fixed to the fixing bracket.

10. The airbag apparatus according to claim 9, wherein the processor is configured to execute a second independent deployment mode in which the roof cushion is independently deployed in a state in which the forward collision signal is detected after the first independent deployment mode, and wherein, in the second independent deployment mode, the coupling unit is configured to separate the roof cushion from the fixing bracket.

11. The airbag apparatus according to claim 7, wherein:

the curtain airbag device is configured as a pair of curtain airbag devices to correspond to a pair of the side windows disposed on both sides of the vehicle;

the roof airbag device is mounted between the pair of curtain airbag devices along a width direction of the vehicle; and the coupling unit is configured as a pair of coupling units to couple opposite ends of the roof cushion in the width direction of the vehicle to be supported on a pair of the curtain cushions, respectively.

12. The airbag apparatus according to claim 7, wherein:

the roof airbag device further comprises a first housing configured to accommodate the roof cushion in a state before deployment;

the curtain airbag device further comprises a second housing configured to accommodate the curtain cushion in the state before deployment;

the first housing is mounted on the roof along a width direction of the vehicle;

the second housing is mounted on the vehicle body along a boundary between the roof and a pillar of the vehicle;

in a state in which the roof cushion and the curtain cushion are in the deployed state, a lower end of the roof cushion is located lower than a lower end of the curtain cushion; and the coupling unit couples a side end of the roof cushion in the deployed state to the lower end of the curtain cushion in the deployed state.

13. An airbag apparatus for a vehicle, the airbag apparatus comprising:

a roof airbag device comprising a roof cushion mounted on a roof of a vehicle body and protruding toward a lower side of a vehicle compartment in a deployed state and a first housing configured to accommodate the roof cushion in a pre-deployed state;

a curtain airbag device comprising a curtain cushion mounted on the vehicle body around a side window to cover the side window in the deployed state and a second housing configured to accommodate the curtain cushion in the pre-deployed state;

a coupling unit configured to couple the roof cushion to be supported on the curtain cushion; and a fixing bracket fixed to the vehicle body between the first housing and the second housing, wherein the coupling unit comprises:

a first tether having a first end coupled to the roof cushion and a second end drawn out of the first housing; and a second tether having a first end coupled to the curtain cushion to be connected to the first tether and having a second end drawn out of the second housing.

14. The airbag apparatus according to claim 12, wherein the coupling unit further comprises:

a first coupling member to which the first tether is connected and detachably coupled to the fixing bracket; and a second coupling member to which the second tether is connected and detachably coupled to the first coupling member.

15. The airbag apparatus according to claim 14, wherein:

a deployment mode of the roof cushion and the curtain cushion comprises a simultaneous deployment mode in which the roof cushion and the curtain cushion are simultaneously deployed; and in the simultaneous deployment mode, the first coupling member and the second coupling member are kept in a state of being connected to each other and the first coupling member is separated from the fixing bracket.

16. The airbag apparatus according to claim 14, wherein:
a deployment mode of the roof cushion and the curtain cushion comprises a first independent deployment mode in which the curtain cushion is independently deployed in a state in which the roof cushion is not deployed; and
in the first independent deployment mode, the first coupling member is kept in a state of being connected to the fixing bracket and the second coupling member is separated from the first coupling member.

17. The airbag apparatus according to claim 16, wherein:
the deployment mode of the roof cushion and the curtain cushion further comprises a second independent deployment mode in which the roof cushion is independently deployed after the first independent deployment mode; and
in the second independent deployment mode, the first coupling member is separated from the fixing bracket.

18. The airbag apparatus according to claim 14, wherein the first coupling member has a ring-shaped opening configured to be opened elastically and is coupled to the fixing bracket so that the ring-shaped opening faces downward.

19. The airbag apparatus according to claim 18, wherein the first coupling member is coupled to a surface of the fixing bracket facing the second housing.

20. A vehicle comprising:
a vehicle body comprising a roof;
a side window on a side of the vehicle body;
a roof airbag device comprising a roof cushion mounted on the roof of the vehicle body and protruding toward a lower side of a vehicle compartment in a deployed state and a first housing configured to accommodate the roof cushion in a pre-deployed state;
a curtain airbag device comprising a curtain cushion mounted on the vehicle body around the side window to cover the side window in the deployed state and a second housing configured to accommodate the curtain cushion in the pre-deployed state;
a coupling unit configured to couple the roof cushion to be supported on the curtain cushion, wherein the coupling unit comprises:
a first tether having a first end coupled to the roof cushion and a second end drawn out of the first housing; and
a second tether having a first end coupled to the curtain cushion to be connected to the first tether and having a second end drawn out of the second housing;
a fixing bracket fixed to the vehicle body between the first housing and the second housing;
a forward collision detection sensor configured to detect a forward collision of the vehicle;
a lateral collision detection sensor configured to detect a lateral collision of the vehicle;
a first inflator configured to deploy the roof cushion by supplying a first airbag gas;
a second inflator configured to deploy the curtain cushion by supplying a second airbag gas; and
a processor configured to operate the first inflator and the second inflator based on a forward collision signal and a lateral collision signal detected through the forward collision detection sensor and the lateral collision detection sensor.

* * * * *

UNITED STATES PATENT AND TRADEMARK OFFICE
CERTIFICATE OF CORRECTION

PATENT NO.       : 12,145,527 B2
APPLICATION NO.  : 18/337248
DATED            : November 19, 2024
INVENTOR(S)      : Kang et al.

Page 1 of 1

It is certified that error appears in the above-identified patent and that said Letters Patent is hereby corrected as shown below:

In the Claims

In Column 12, in Claim 14, Line 55, delete "claim 12," and insert -- claim 13, --.

Signed and Sealed this
Twenty-first Day of January, 2025

Coke Morgan Stewart
*Acting Director of the United States Patent and Trademark Office*